(12) United States Patent
Jaquette (10) Patent No.: US 12,277,097 B2
(45) Date of Patent: Apr. 15, 2025

(54) USING CIPHERTEXT TO DEDUPLICATE DATA USING WIDE-BLOCK ENCRYPTION

(71) Applicant: International Business Machines Corporation, Armonk, NY (US)

(72) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/224,500

(22) Filed: Jul. 20, 2023

(65) Prior Publication Data

US 2025/0028692 A1    Jan. 23, 2025

(51) Int. Cl.
    *G06F 16/00*         (2019.01)
    *G06F 16/215*       (2019.01)
    *H04L 9/06*          (2006.01)

(52) U.S. Cl.
    CPC .......... *G06F 16/215* (2019.01); *H04L 9/0631* (2013.01)

(58) Field of Classification Search
    CPC .............................. G06F 16/215; H04L 9/0631
    See application file for complete search history.

(56) References Cited

U.S. PATENT DOCUMENTS

| | | | |
|---|---|---|---|
| 4,467,354 A | 8/1984 | Eby, Jr. et al. | |
| 5,778,395 A | 7/1998 | Whiting et al. | |
| 6,983,365 B1 | 1/2006 | Douceur et al. | |
| 7,266,689 B2 | 9/2007 | Douceur et al. | |
| 7,406,595 B1 | 7/2008 | Boyle, Jr. et al. | |
| 7,827,408 B1 | 11/2010 | Gehringer et al. | |
| 8,218,759 B2 | 7/2012 | Moffat et al. | |
| 8,259,934 B2 | 9/2012 | Karroumi et al. | |
| 8,634,549 B2 | 1/2014 | Schneider | |
| 9,237,014 B2 | 1/2016 | Leung et al. | |
| 9,407,437 B1 | 8/2016 | Campagna | |
| 9,635,011 B1 | 4/2017 | Wu et al. | |
| 9,930,099 B2 | 3/2018 | McCanne et al. | |
| 10,044,509 B1 | 8/2018 | Kirshner | |
| 10,348,486 B2 | 7/2019 | Karame | |
| 10,430,102 B2 | 10/2019 | Kaczmarczyk et al. | |

(Continued)

FOREIGN PATENT DOCUMENTS

| | | | |
|---|---|---|---|
| CN | 104303452 A | 1/2015 | |
| CN | 108200172 A | 6/2018 | |

OTHER PUBLICATIONS

Kavade et al., "Secure De-Duplication using Convergent Keys (Convergent Cryptography) for Cloud Storage," International Journal of Computer Applications, vol. 126, No. 10, Sep. 2015, pp. 5-9.

(Continued)

*Primary Examiner* — Dinku W Gebresenbet
(74) *Attorney, Agent, or Firm* — Zilka-Kotab, P.C.

(57) ABSTRACT

A computer-implemented method, according to one embodiment, includes: compressing an uncompressed instance of data to create a compressed instance of data. In response to determining that a size of the compressed instance of data is outside a predetermined range, the uncompressed instance of the data is encrypted utilizing wide-block encryption to create a ciphertext string. Moreover, a predetermined subset of the encrypted uncompressed instance of data in the ciphertext string is used to perform deduplication at a data storage server.

20 Claims, 5 Drawing Sheets

(56) References Cited

U.S. PATENT DOCUMENTS

| | | | |
|---|---|---|---|
| 10,459,801 | B2 | 10/2019 | Bangalore et al. |
| 10,489,249 | B2 | 11/2019 | Bangalore et al. |
| 10,514,986 | B2 | 12/2019 | Bangalore et al. |
| 11,601,257 | B2 | 3/2023 | Jaquette |
| 11,695,541 | B2 | 7/2023 | Jaquette et al. |
| 2003/0074319 | A1 | 4/2003 | Jaquette |
| 2007/0101412 | A1 | 5/2007 | Yang et al. |
| 2010/0199042 | A1 | 8/2010 | Bates et al. |
| 2011/0103580 | A1 | 5/2011 | Hazay et al. |
| 2013/0198509 | A1 | 8/2013 | Buruganahalli et al. |
| 2015/0379276 | A1 | 12/2015 | Glickman et al. |
| 2017/0091046 | A1* | 3/2017 | Bangalore ............... G06F 16/11 |
| 2017/0134160 | A1 | 5/2017 | Onoda |
| 2017/0243012 | A1 | 8/2017 | Karame et al. |
| 2018/0176014 | A1 | 6/2018 | Campagna |
| 2018/0191492 | A1 | 7/2018 | Barham et al. |
| 2019/0215155 | A1* | 7/2019 | Wang ................... H04L 9/0894 |
| 2020/0213109 | A1 | 7/2020 | Perlman et al. |
| 2020/0366895 | A1 | 11/2020 | De Luxán Hernández et al. |
| 2021/0377016 | A1 | 12/2021 | Perlman et al. |
| 2022/0103338 | A1 | 3/2022 | Brooker et al. |
| 2022/0182217 | A1 | 6/2022 | Jaquette et al. |
| 2022/0182219 | A1* | 6/2022 | Jaquette ................ H04L 9/0625 |
| 2022/0182242 | A1 | 6/2022 | Jaquette et al. |
| 2024/0311472 | A1* | 9/2024 | Zhang ................... G06F 21/554 |

OTHER PUBLICATIONS

Jaquette et al., U.S. Appl. No. 17/114,058, filed Dec. 7, 2020.
Non-Final Office Action from U.S. Appl. No. 17/114,058, dated Apr. 28, 2022.
Final Office Action from U.S. Appl. No. 17/114,058, dated Aug. 15, 2022.
Notice of Allowance from U.S. Appl. No. 17/114,058, dated Feb. 23, 2023.
Supplemental Notice of Allowance from U.S. Appl. No. 17/114,058, dated May 1, 2023.
Jaquette et al., U.S. Appl. No. 18/128,820, filed Mar. 30, 2023.
Wikipedia, "Convergent encryption," Wikipedia, 2020, 2 pages, retrieved from https://en.wikipedia.org/wiki/Convergent_encryption.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
U.S. Appl. No. 16/540,088, filed Aug. 14, 2019.
U.S. Appl. No. 16/199,268, filed Nov. 26, 2018.
Harkins, D., "Synthetic Initialization Vector (SIV) Authenticated Encryption Using the Advanced Encryption Standard (AES)," Aruba Networks, Oct. 2008, 27 pages, retrieved from https://tools.ietf.org/html/rfc5297.
International Search Report and Written Opinion from PCT Application No. PCT/CN2021/128720, dated Jan. 24, 2021.
Jaquette et al., U.S. Appl. No. 17/112,679, filed Dec. 4, 2020.
Non-Final Office Action from U.S. Appl. No. 17/112,679, dated Jul. 6, 2022.
Notice of Allowance from U.S. Appl. No. 17/112,679, dated Oct. 21, 2022.
Wei et al., "MAD2: A Scalable High-Throughput Exact Deduplication Approach for Network Backup Services," IEEE, May 2010, 15 pages.
Anonymous, "A method for fast integer format preserving encryption for large integers," IP.com Prior Art Database, Technical Disclosure No. IPCOM000245153D, Feb. 14, 2016, 4 pages.
Anonymous, "Method to avoid re-encryption of data in deduplication enabled storage controllers," IP.com Prior Art Database Technical Disclosure No. IPCOM000260404D, Nov. 19, 2019, 6 pages.
Anonymous, "Instance based format preserving encryption and tokenization," IP.com Prior Art Database, Technical Disclosure No. IPCOM000244284D, Nov. 30, 2015, 7 pages.
IEEE, "IEEE 1619.2-2010—IEEE Standard for Wide-Block Encryption for Shared Storage Media," IEEE Standards Association, 2020, retrieved from https://standards.ieee.org/standard/1619_2-2010.html.
IEEE Computer Society, "IEEE Standard for Wide-Block Encryption for Shared Storage Media," IEEE Standards Association, Mar. 8, 2011, 91 pages.

* cited by examiner

USING CIPHERTEXT TO DEDUPLICATE DATA USING WIDE-BLOCK ENCRYPTION

BACKGROUND

The present invention relates to data encryption, and more particularly, this invention relates to implementing deterministic encryption of data that facilitates data deduplication.

Data deduplication contributes to improving performance of a system by reducing the number of duplicate instances of data that are stored in memory. Duplicate instances of data may be replaced with pointers to an initial instance of the data, thereby maintaining data integrity while also improving data storage capacity.

Conventional products implement data deduplication using cryptographic hash values that create a fingerprint of the data. This fingerprint may thereby be compared against other hash values to determine whether a duplicate copy of data exists. However, computation of cryptographic hash values is a compute intensive process that can be challenging at times. Accordingly, dedicated hardware is used in some conventional products to calculate the hash values, but this significantly increases the implementation costs for such conventional products.

Other conventional products implement the hash value calculations in an existing compute component to avoid the increased cost associated with the dedicated component, but this results in a significant amount of the existing compute component's achievable throughput being dedicated to calculating hash values. This significantly reduces efficiency of the conventional products, resulting in a choice between poor performance or high cost, neither of which are desirable.

BRIEF SUMMARY

A computer-implemented method, according to one embodiment, includes: compressing an uncompressed instance of data to create a compressed instance of data. In response to determining that a size of the compressed instance of data is outside a predetermined range, the uncompressed instance of the data is encrypted utilizing wide-block encryption to create a ciphertext string. Moreover, a predetermined subset of the encrypted uncompressed instance of data in the ciphertext string is used to perform deduplication at a data storage server.

A computer program product, according to another embodiment, includes a computer readable storage medium having program instructions embodied therewith. The program instructions are readable by a processor, executable by the processor, or readable and executable by the processor, to cause the processor to: perform the foregoing method.

A system, according to yet another embodiment, includes: a data storage server, as well as logic that is integrated with the data storage server, executable by the data storage server, or integrated with and executable by the data storage server. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for reducing hash computation while still being able to deduplicate data at the storage controller location. Accordingly, implementations herein are able to achieve faster and more comprehensive data analysis across a shared network model, thereby creating an opportunity for deeper insights, faster response times, improved customer experiences, greater adoption rates, etc., e.g. as will be described in further detail below.

In one general embodiment, a computer-implemented method includes: compressing an uncompressed instance of data to create a compressed instance of data. In response to determining that a size of the compressed instance of data is outside a predetermined range, the uncompressed instance of the data is encrypted utilizing wide-block encryption to create a ciphertext string. Moreover, a predetermined subset of the encrypted uncompressed instance of data in the ciphertext string is used to perform deduplication at a data storage server.

In another general embodiment, a computer program product includes a computer readable storage medium having program instructions embodied therewith. The program instructions are readable by a processor, executable by the processor, or readable and executable by the processor, to cause the processor to: perform the foregoing method.

In yet another general embodiment, a system includes: a data storage server, as well as logic that is integrated with the data storage server, executable by the data storage server, or integrated with and executable by the data storage server. The logic is configured to: perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
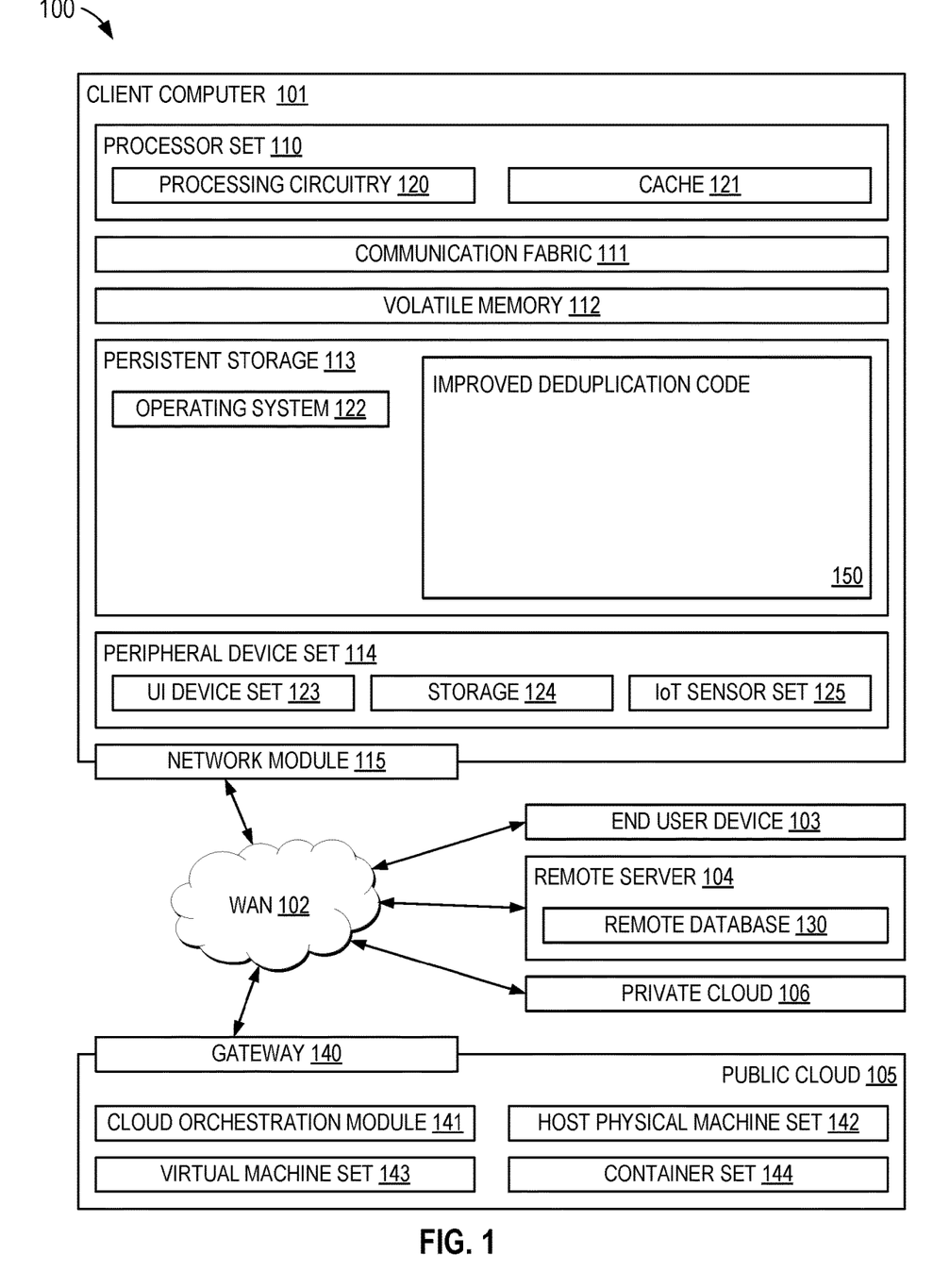
FIG. 1 is a diagram of a computing environment, in accordance with one embodiment.

Computing environment 100 contains an example of an environment for the execution of at least some of the computer code involved in performing the inventive methods, such as improved data deduplication code at block 150 for deduplicating data received at a data storage server. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As noted above, data deduplication contributes to improving performance of a system by reducing the number of duplicate instances of data that are stored in memory. Duplicate instances of data may be replaced with pointers to an initial instance of the data, thereby maintaining data integrity while also improving data storage capacity.

While data deduplication provides improvements to performance, it has also introduced compute overhead to conventional products. These conventional products perform data deduplication by calculating hash values that can be used to map data of arbitrary size to fixed-size values. These hash values may thereby be compared to determine whether duplicate portions of data exist. However, this process of calculating a hash value for each portion of data introduces a significant amount of processing overhead which negatively affects the throughput of the system.

In fact, the computational overhead associated with calculating hash numbers for deduplication in these conventional products is becoming intensive enough that dedicated compute components (e.g. microprocessors cryptographic co-processors, an arithmetic logic unit (ALU), a data processing unit (DPU), or other dedicated logic such as an ASIC or field programmable gate array (FPGA) have been implemented to shoulder the additional compute load. However, adding dedicated components adds expense, thereby increasing the cost of creating and maintaining conventional products.

In sharp contrast to these conventional products which experience compute overhead associated with performing deduplication, approaches included herein are able to achieve deduplication without introducing any additional compute overhead. Thus, approaches herein are able to perform data deduplication without specifically calculating hash values, e.g. as described in further detail below.

Figure 2A:
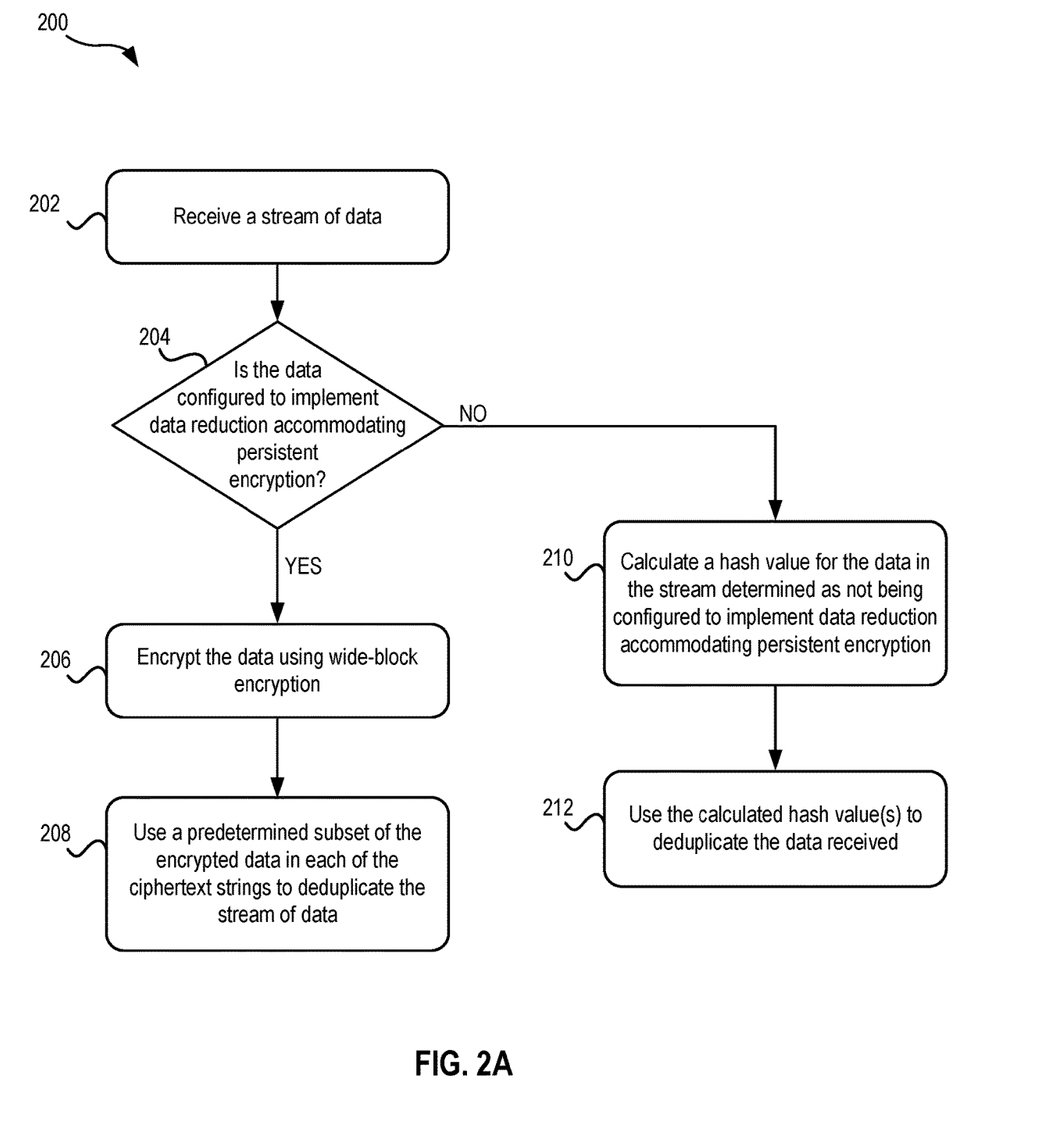
FIG. 2A is a flowchart of a method, in accordance with one embodiment.

Referring now to FIG. 2A, a flowchart of a method 200 for reducing hash computation while still being able to deduplicate data at the storage controller location is shown according to one embodiment. Method 200 may be performed in accordance with the present invention in any of the environments depicted in FIG. 1, among others, in various embodiments. Of course, more or less operations than those specifically described in FIG. 2A may be included in method 200, as would be understood by one of skill in the art upon reading the present descriptions.

Each of the steps of method 200 may be performed by any suitable component of the operating environment. For example, in some embodiments one or more of the operations in method 200 may be performed by a data storage controller (e.g. see remote server 104 and remote database 130 of FIG. 1). In various other embodiments, the method 200 may be partially or entirely performed by a server, a processor, a computer, etc., or some other device having one or more processors therein.

Thus, in some embodiments, method 200 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g. processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an ASIC, a FPGA, etc., combinations thereof, or any other suitable computing device known in the art.

As shown in FIG. 2A, operation 202 of method 200 includes receiving a stream of data. As noted above, one or more of the operations in method 200 may be performed at different locations depending on the implementations. However, in some implementations, method 200 may be performed at a data storage server of a distributed system. Accordingly, the data stream may be received at a data storage server in some instances.

However, the data stream may be received at a central controller, a data management controller, etc. The amount of data received at operation 202 may also vary depending on the approach. For instance, the rate at which data is received may vary depending on the size (e.g. speed, flow rate, etc.) of the data stream. According to some implementations, the data stream may be received at a fixed-block storage controller capable of implementing data reduction accommodating persistent encryption encoding, and which may be implemented at the storage volume level. Thus, data reduction accommodating persistent encryption encoding is typically applicable to some of the storage volumes received, while other storage volumes are not capable of implementing this encoding.

It should be noted that in some approaches, the data stream may be stored temporarily in a cache. Thus, as volumes are stored in cache (e.g. a storage pool) data deduplication may be performed across the volumes. The cache may thereby allow for the data stream to be processed regardless of whether data is being received faster than it can be evaluated. In other words, the cache may be used as a temporary storage that saves data overflow to avoid errors resulting from data loss (e.g. corruption). It follows that the data is preferably evaluated as it is received.

The format of data received in a data stream may also vary depending on the approach. For instance, the data may be received as an uncompressed instance of plaintext in some approaches (e.g. see plaintext 304 and 404 of FIGS. 3 and 4 below). Moreover, the data may be received in packets (e.g. predetermined subsets), an uninterrupted stream of information, as whole files, etc., depending on the desired implementation. Operation 204 thereby broadly includes inspecting the data stream received to determine additional information about the data stream. According to a specific implementation, operation 204 includes determining whether the data in the stream is configured to implement data reduction accommodating persistent encryption.

A data stream that is configured to implement data reduction accommodating persistent encryption desirably allows for the data in the stream to be encrypted using wide-block encryption. As noted above, encrypting an instance of data utilizing wide-block encryption may include applying a wide-block encryption algorithm to the data. For example, an EME2 (e.g. EME2-AES) encryption algorithm, an XCB (e.g. XCB-AES) encryption algorithm, etc., or other types of wide-block encryption algorithms that would be apparent to one skilled in the art after reading the present description may be applied to an instance of data. However, data that is not configured to implement data reduction accommodating persistent encryption may not be encrypted using wide-block encryption.

A storage controller may be able to determine whether a given instance of data is configured to implement data reduction accommodating persistent encryption encoding as a result of evaluating version bits included in metadata (e.g. an "as_encoded" field) and determining whether the version bits are equal to a format version known to be of the wide-block encryption type. For example, values of 1000 and 1001 may indicate that the corresponding instance of data is configured to implement data reduction accommodating persistent encryption.

It follows that operation 204 determines how the data in the stream received at operation 202 may be processed. Again, data encoded with data reduction accommodating persistent encryption may be encrypted using wide-block encryption. Accordingly, method 200 proceeds from operation 204 to operation 206 in response to determining that at least some of the data received in the stream is configured to implement data reduction accommodating persistent encryption. There, operation 206 includes encrypting the data using wide-block encryption to create ciphertext strings.

A wide-block encryption algorithm may also be applied to the data differently depending on the embodiment. For instance, the size of a portion of memory after being compressed may be used to determine whether the data should be compressed at all, e.g. as will be described in further detail below (e.g. see operation 224 of FIG. 2B). In one embodiment, the wide-block encryption algorithm may behave as a single block cipher with a large unencrypted (plaintext) input and a large encrypted (ciphertext) output.

However, the wide-block encryption algorithm may also use narrow block ciphers, such as Advanced Encryption Standard (AES), internally. In another embodiment, the wide-block encryption algorithm may use a compressed instance of data as input. In yet another embodiment, a wide-block encryption algorithm may encrypt a larger portion of data (e.g. an entire sector, etc.) when compared to narrow-block encryption algorithms. In another embodiment, the wide-block encryption algorithm may output an encrypted compressed instance of data. In still another embodiment, the encrypted compressed instance of data may include an instance of ciphertext (e.g. encrypted text resulting from applying an encryption algorithm to a compressed instance of plaintext, etc.).

From operation 206, method 200 proceeds to operation 208. There, operation 208 includes using a predetermined subset of the encrypted data in each of the ciphertext strings to deduplicate the stream of data. Moreover, this is done without calculating any hash values. In other words, operation 208 includes using a same subset of the encrypted data in each of the ciphertext strings to perform deduplication. With respect to the present description, the "same subset of encrypted data" in each ciphertext string is intended to refer to a same portion of the ciphertext string.

According to an example, which is in no way intended to limit the invention, each ciphertext string includes 4096 bytes of information, where a first 16 bytes of information in each ciphertext string are used to perform the deduplication. Bytes 0 through 15 of each ciphertext string may thereby be compared to each other in order to determine whether two or more of the ciphertext strings are duplicate copies. However, any subset of 16 bytes in the ciphertext strings may be compared to each other. For example, bytes 1 through 16, bytes 2 through 17, bytes 10 through 25, bytes 22 through 32, bytes 70 through 85, etc., or any desired combination of sequential bytes may be used to perform the deduplication. However, it should be noted that the predetermined subset of the encrypted data in each of the ciphertext strings is preferably shorter (less data) than the whole ciphertext string.

In still other approaches, the predetermined bytes in the ciphertext string used to perform the deduplication are not sequential. In other words, bytes 2 through 10 and bytes 20 through 26 of each ciphertext string may be used to perform the deduplication. Additionally, any desired number of bytes in the ciphertext string may be used to perform the deduplication. For example, any same subset of 12 bytes in each of the ciphertext strings may be compared to each other. In other instances, any same subset of 5, 8, 10, 18, 20, 25, 30, etc., bytes in each of the ciphertext strings may be used to perform the deduplication.

Using portions of the encrypted data in the ciphertext strings themselves to perform the deduplication desirably avoids the process of computing hash values in order to perform deduplication. As noted above, conventional products have experienced reduced performance stemming from the compute overhead consumed by computing hash values to deduplicate data. It follows that approaches included herein are able to avoid this compute overhead experienced in conventional products as a result of the wide-block encryption used to process at least some of the data that is received. In other words, the process of performing wide-block encryption desirably converts the data such that at least some of a resulting ciphertext string may be used to perform a deduplication process. The wide-block encryption thereby allows for a same portion of each resulting ciphertext string to be compared against each other to determine if any duplicates can be removed by creating a pointer to a resulting copy.

Returning to operation 204, some of the data received in the stream may not be configured to implement data reduction accommodating persistent encryption. Accordingly, some of the data received at operation 202 may not be processed using wide-block encryption. A data stream may thereby include data of different types having different configurations, e.g. resulting from different processing.

This impacts how at least some of the data in the stream received at operation 202 may be processed. Again, data that is not encoded with data reduction accommodating persistent encryption may not be encrypted desirably (e.g. efficiently) using wide-block encryption. Accordingly, method 200 proceeds from operation 204 to operation 210 in response to determining that at least some of the data received in the stream is not configured to implement data reduction accommodating persistent encryption.

There, operation 210 includes calculating a hash value for the data in the stream determined as not being configured to implement data reduction accommodating persistent encryption. Operation 212 further includes using the calculated hash value(s) to deduplicate the data received. As noted above, at least some received data is not configured to implement data reduction accommodating persistent encryption. Operations 210 may thereby include encrypting the data using an encryption mode other than wide-block encryption. The data not configured to implement data reduction accommodating persistent encryption may thereby include an initialization vector (IV) field as a result of being encrypted, e.g. as would be appreciated by one skilled in the art after reading the present description.

Again, operations of method 200 may be performed by a data storage server in some implementations. It follows that the data stream may be deduplicated at a data storage server in real-time as the data stream is received. Moreover, by utilizing the results of wide-block encryption, at least some of the data received may be deduplicated using a process that introduces far less compute overhead in comparison to conventional products as a result of not computing hash values. Method 200 is thereby able to improve performance of a processor performing data deduplication, e.g. such as a data storage server at a data storage location of a distributed system.

Figure 2B:
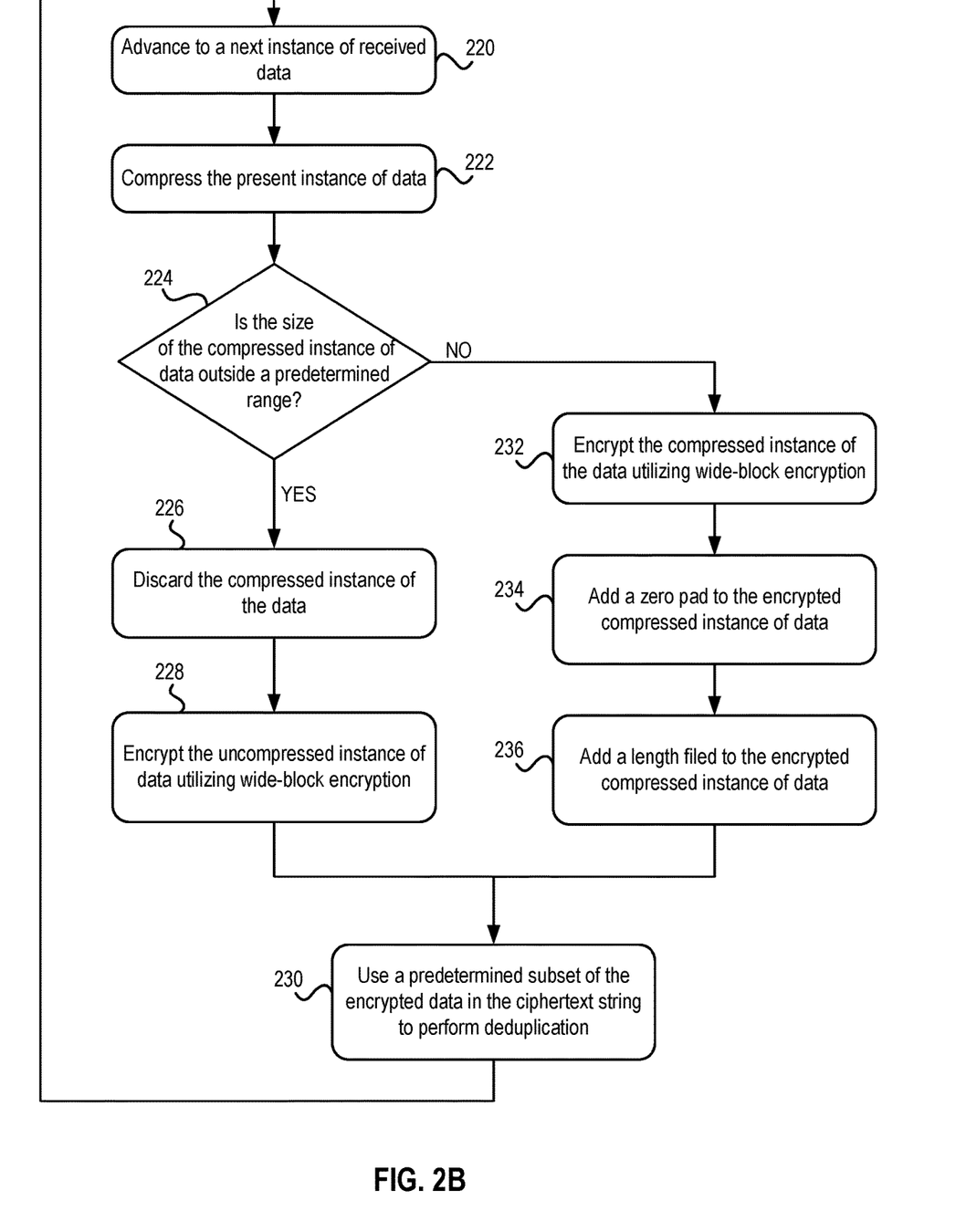
FIG. 2B is a flowchart of sub-operations which involve the operations in the method of FIG. 2A, in accordance with one embodiment.

Looking now to FIG. 2B, exemplary sub-operations of using a predetermined subset of the encrypted data in each of the ciphertext strings to deduplicate a stream of data are illustrated in accordance with one embodiment. It follows that any one or more of the sub-operations in FIG. 2B may be used to perform operations 206 and/or 208 of FIG. 2A. However, it should be noted that the sub-operations of FIG. 2B are illustrated in accordance with one embodiment which is in no way intended to limit the invention.

As shown, sub-operation 220 of the flowchart in FIG. 2B includes advancing to a next instance of received data, while sub-operation 222 includes compressing the instance of data in response to determining the instance is uncompressed. In other words, uncompressed instances of data are preferably compressed to create compressed instances of data. The uncompressed instance of data may be compressed utilizing one or more compression algorithms to create the compressed instance of data. For example, a compression algorithm may be applied to an uncompressed instance of data to create the compressed instance of data.

It should also be noted that, with respect to the present description, an "instance of data" may include any desired collection of data, e.g. such as a block of data having a predetermined size, an amount of data received in a predetermined amount of time, a complete user file, etc. Moreover, the uncompressed instance of data may include data identified to be encrypted in some implementations. For example, a request to encrypt the uncompressed instance of data may be received from an application, from a user, etc. In another implementation, the uncompressed instance of data may include an instance of plaintext.

Again, at least a portion of data received in a stream at a data storage server may be uncompressed. For instance, uncompressed plaintext may be received at the data storage server, e.g. to be saved in memory. Accordingly, sub-operation 222 may also include determining whether each instance of data has already been compressed. In situations where a data instance has already been compressed, sub-operation 222 may simply be skipped, proceeding directly to sub-operation 224.

Sub-operation 224 includes determining whether a size of the compressed instance of data is outside a predetermined range. In other words, sub-operation 224 includes comparing a size of the compressed instance of data to a predetermined range to determine how the instance should be evaluated. It should also be noted that "outside a predetermined range" is in no way intended to limit the invention. Rather than determining whether a value is outside a predetermined range, equivalent determinations may be made, e.g. as to whether a value is within a predetermined range, whether a value is above a threshold, whether an absolute value is above a threshold, whether a value is below a threshold, etc., depending on the desired approach.

The predetermined range may correspond to a total length of a ciphertext string. By comparing the size of the compressed instance of data to a predetermined range, sub-operation 224 may be able to determine if additional information may be added to the compressed instance while staying below a desired (e.g. maximum) size of the ciphertext string. For example, a zero pad, length field, etc., may be added to an encrypted compressed instance of data to create a ciphertext string (e.g. see length field 310 and zero pad 312 of FIG. 3). However, it should be noted that an IV field is not included in the instance of data, e.g. as a result of implementing wide-block encryption. Thus, the predetermined range may include a threshold data size. In other implementations, the predetermined range may include a size of the sum of (i) a length field, and (ii) a predetermined zero pad having a varied length (e.g. size).

In situations where a compressed instance of data is large enough that additional information cannot be added to the ciphertext string, it is preferred that the uncompressed version of the instance of data is encrypted, rather than the compressed instance of data. Thus, in response to determining that the size of the compressed instance of data is outside a predetermined range, the flowchart proceeds to sub-operation 226. There, sub-operation 226 includes discarding the compressed instance of the data formed in sub-operation 222. In other words, the compressed instance of data may be abandoned (e.g. erased, flagged, etc.); deleted (e.g. overwritten, removed, etc.); etc., in response to determining that the size of the compressed instance of data is greater than a predetermined threshold.

Sub-operation 228 further includes encrypting the uncompressed instance of data utilizing wide-block encryption. The uncompressed instance of data is thereby encrypted utilizing wide-block encryption, without first being compressed. Moreover, this wide-block encryption forms an encrypted ciphertext string of a given length. For instance, the specific type of wide-block encryption used may impact the length of the resulting encrypted ciphertext string. In preferred instances, the encrypted uncompressed instance of data may have a smaller size/length than that of the uncompressed instance of data before performing the wide-block encryption. However, the relative size of the encrypted uncompressed instance and the uncompressed instance of data may vary depending on the implementation.

As noted above, the specific type of wide-block encryption algorithm implemented may include an EME2-AES encryption algorithm, an XCB-AES encryption algorithm, etc., or other types of wide-block encryption algorithms that would be apparent to one skilled in the art after reading the present description. In an illustrative implementation, the wide-block encryption algorithm may behave as a single block cipher, and may take the uncompressed instance of data as input.

In another illustrative implementation, the wide-block encryption algorithm may include a narrow block cipher (e.g. an advanced encryption standard (AES) cipher) internally while encrypting the uncompressed instance of data. For example, the AES mode (EME2-AES or XCB-AES) may be converting what is otherwise a narrow block encryption cipher (i.e. AES) into a wide block cipher. Moreover, the wide-block encryption algorithm may output the encrypted uncompressed instance of data. In some approaches, the encrypted uncompressed instance of data may include an instance of ciphertext (e.g. encrypted text resulting from applying an encryption algorithm to an uncompressed instance of plaintext, etc.).

The ciphertext string formed in sub-operation 228 may be stored in memory and/or transmitted depending on the approach. For example, in some approaches the ciphertext string may be stored in a database, a distributed storage system, a cloud computing environment, etc. In other approaches, ciphertext strings may be sent via one or more networks to one or more users, one or more devices, one or more remote storage systems, etc.

In this way, a fully deterministic ciphertext string may be created and stored for the instance of data. The ciphertext string is fully deterministic in that, using the above wide-block encryption techniques, a given ciphertext string created for a given instance of data using a given key may be identical to another ciphertext string created for a second instance of data using the same given key if the first instance of data is identical to the second instance of data and the keys are the same. As a result, duplicate portions of encrypted ciphertext strings may be identified within hardware storage and removed. This deduplication increases available storage space within the hardware storage, and improves the performance of the hardware storage, while maintaining the security of the stored data via robust encryption.

Accordingly, sub-operation 230 includes using a predetermined subset of the encrypted data in the ciphertext string to perform deduplication. In other words, a portion of the encrypted data instance in a ciphertext string formed in sub-operation 228 is compared against corresponding portions in other ciphertext strings formed. The portions of the ciphertext strings compared preferably overlap such that a same portion of a first encrypted data instance is compared against a same portion of a second encrypted data instance, e.g. as will be described in further detail below.

Returning now to sub-operation 224, the flowchart proceeds to sub-operation 232 in response to determining that the size of the compressed instance of data is not outside a predetermined range. There, sub-operation 232 includes encrypting the compressed instance of the data utilizing wide-block encryption.

It follows that the compressed instance of encrypted data is at least smaller than a threshold, thereby allowing for additional information to be added when forming the ciphertext string. Accordingly, sub-operation 234 includes adding a zero pad to the encrypted compressed instance of data to create a ciphertext string. A length field may also be added to the encrypted compressed instance of data in some implementations. See sub-operation 236. As noted above, the resulting encrypted compressed instance of data and appended information may be stored in memory and/or transmitted to another location depending on the implementation. For example, in some embodiments, the ciphertext string may be stored in a database, a distributed storage system, a cloud computing environment, etc.; while in other embodiments, the ciphertext string may be sent via one or more networks to one or more users, one or more devices, one or more remote storage systems, etc.

The zero pad may include a predetermined minimum number of bytes with a compressible and easily detectable pattern, e.g. such as all bytes being written with zeroes. In some implementations, the zero pad may have a length greater than a predetermined threshold. For example, the zero pad may include a variable number of bytes, with a minimum length.

Depending on the approach, the zero pad may be prepended or appended to the encrypted compressed instance of data, to a length field, etc. In another embodiment, a length of the length field may be subtracted from a length of the uncompressed instance of data (in bytes) to determine a length of the zero pad. In yet another embodiment, a length of the length field, the encrypted compressed instance of data, and the zero pad may equal a length of the uncompressed instance of data, adjusting the length of the zero pad field as necessary to achieve that.

The length field may include a field having a predetermined length (e.g. a predetermined length of two bytes, etc.) that indicates a length of the encrypted compressed instance of data. In another embodiment, a length of the encrypted compressed instance of data may be determined, and the length may be encoded into the length field and prepended or appended to the encrypted compressed instance of data. In another embodiment, the size of the length field may be calculated based on a size of the encrypted compressed instance of data. In this way, length preserving compression (LPC) may be implemented while compressing and encrypting the instance of data.

It should also be noted that the zero pad may be used to identify the encrypted compressed instance of data (e.g. in response to receiving the encrypted compressed instance of data or reading the encrypted compressed instance of data from storage). For example, upon receipt of the ciphertext string, a receiving entity may search the string for a zero pad (e.g. at a predetermined location within the ciphertext string, etc.). In another example, if the zero pad is identified, the ciphertext string may be identified as an encrypted compressed instance of data. In yet another example, if the zero pad is not identified, the ciphertext string may be identified as an encrypted uncompressed instance of data.

In this way, a fully deterministic ciphertext string may be created and stored for the instance of data. The ciphertext string is fully deterministic in that, using the above wide-block encryption techniques, a first ciphertext string created for a first instance of data using a given key may be identical to a second ciphertext string created for a second instance of data encrypted using the same key if the first instance of data is identical to the second instance of data and the keys are identical (the same). As a result, duplicate ciphertext strings may be identified within hardware storage and may be removed, thereby increasing available storage space within the hardware storage, and improving the performance of the hardware storage, while maintaining the security of the stored data via robust encryption.

More specifically, because the encrypted compressed instance of data is encrypted using wide-block encryption, security vulnerability is avoided. Also, by utilizing wide-block encryption to encrypt the compressed instance of data, the need to create and include an initialization vector with the ciphertext string may be avoided, which may reduce an amount of processing necessary to create the ciphertext string, thereby improving the format efficiency of a computing device that creates the ciphertext string and so reduces the amount of storage space required, potentially increasing the effective storage capacity of the storage device.

Referring still to FIG. 2B, the flowchart proceeds from sub-operation 236 to sub-operation 230. As noted above, sub-operation 230 includes using a predetermined subset of the encrypted data in the ciphertext string to perform deduplication. In other words, a portion of the encrypted instance of data in a ciphertext string formed in sub-operation 228 is compared against corresponding portions in other ciphertext strings formed.

The portions of the ciphertext strings compared preferably overlap such that a same portion of the encrypted instance of data in a first ciphertext string is compared against a same portion of the encrypted instance of data in a second ciphertext string. In other words, the same number of bytes of information in each of the encrypted instances of data are used to perform the deduplication.

According to an example, which is in no way intended to limit the invention, each ciphertext string may include 4096 bytes of information, where a first 16 bytes of information in each ciphertext string are used to perform the deduplication. Bytes 0 through 15 of each ciphertext string may thereby be compared to each other in order to determine whether two or more of the ciphertext strings are duplicate copies. However, any subset of 16 bytes in the ciphertext strings may be compared to each other. For example, bytes 1 through 16, bytes 2 through 17, bytes 10 through 25, bytes 22 through 32, bytes 70 through 85, etc., or any desired combination of sequential bytes may be used to perform the deduplication. In other instances, a last number of bytes in a encrypted ciphertext string may be used to perform the deduplication.

However, any desired number of bytes of information from each encrypted instance of data may be used to perform the deduplication, e.g. such as 5 bytes, 8 bytes, 9 bytes, 10 bytes, 12 bytes, 14 bytes, 20 bytes, 25 bytes, 50 bytes, 100 bytes, etc., of information. While any desired number of bytes of information from each encrypted instance of data may be used to perform the deduplication, it is again preferred that overlapping ones of the bytes from each encrypted instance of data are compared. Thus, any same subset of 5, 8, 10, 18, 20, 25, 30, etc., bytes in each of the ciphertext strings may be used to perform the deduplication. According to an example, the same bytes numbered 2 through 18 of each ciphertext string are compared against each other to perform the deduplication procedure, e.g. as would be appreciated by one skilled in the art after reading the present description. In still other approaches, the predetermined bytes in the ciphertext string used to perform the deduplication are not sequential. In other words, bytes 2 through 10 and bytes 20 through 26 of each ciphertext string may be used to perform the deduplication.

Again, the predetermined subset of the encrypted data used to perform the deduplication preferably includes bytes included in the actual encrypted data instance, rather than the length field, zero pad, and/or other information that may also be present. Moreover, a plurality of ciphertext strings in data storage may be accumulated over time and compared (e.g. analyzed) in sub-operation 230.

By comparing overlapping (e.g. matching) portions of encrypted data instances to perform deduplication, implementations herein are able to remove redundant copies of data without calculating hash values. As noted above, the process of performing wide-block encryption on data instances configured to implement data reduction accommodating persistent encryption desirably allows for the data in the stream to be encrypted using wide-block encryption.

For instance, one or more of plurality of ciphertext strings may be created by performing wide-block encryption on an uncompressed instance of plaintext to create an encrypted uncompressed instance of plaintext having a length matching a length of the uncompressed instance of plaintext. In some approaches, one or more of a plurality of ciphertext strings may be created by performing wide-block encryption on a compressed instance of plaintext to create an encrypted compressed instance of plaintext. A length field and variable-length zero pad may be added to the encrypted compressed instance of plaintext to create a ciphertext string having a length matching a length of the uncompressed instance of plaintext.

This process of using wide-block encryption to modify an instance of data (that is compressed or uncompressed depending on the side of the instance of data) converts the encrypted data instance itself into a unique identifier of sorts. Thus, a predetermined subset of the bytes in the ciphertext field of the encrypted data instances may be used to determine whether deduplication is desired. In other words, the predetermined subset of the bytes in the ciphertext field of the encrypted data instances may be used as pseudo-hash values. Again, this allows for implementations herein to not compute unique hash values for each data instance, thereby reducing compute overhead and significantly improving performance efficiency.

Accordingly, at least some of the data received at a data storage server may be deduplicated using less compute overhead than conventionally achievable, thereby improving efficiency of the data storage server in embodiments herein. Again, using wide-block encryption modifies the data such that bytes of the encrypted data itself can be used for deduplication.

One or more redundant ciphertext strings may be removed from the data storage, based results of performing sub-operation 230. For instance, in response to determining that one or more matches (duplicates) are found for a given ciphertext string in data storage, one or more instances of the given ciphertext string may be removed (e.g. deleted, migrated, etc.) from the data storage. In another embodiment, duplicate ciphertext strings may be removed from the data storage such that a single instance of the ciphertext string remains in the data storage, with each of the other duplicate ciphertext strings being replaced with a pointer to the only remaining instance of the ciphertext string.

Further still, from operation 230, the flowchart returns to operation 220 such that a next instance of data received may be evaluated and deduplicated. It follows that the operations and sub-operations of FIGS. 2A-2B are able to achieve deduplication at data storage locations by significantly reducing the computational overhead associated with doing so. Again, this allows implementations herein to increase the amount of available storage space in data storage, thereby improving performance of the hardware implementing the method 200.

Figure 3:
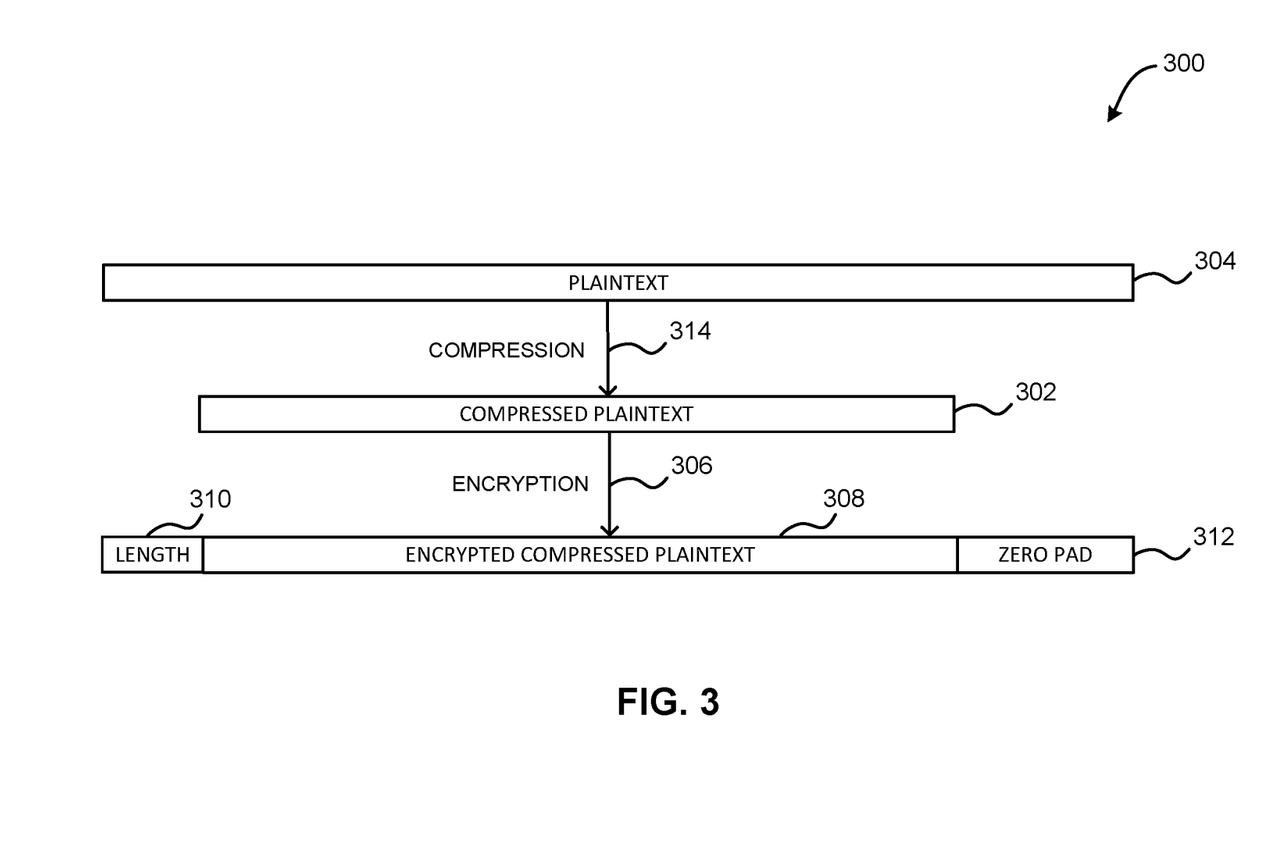
FIG. 3 is a representational view of performing wide-block encryption of a compressed instance of plaintext, in accordance with one embodiment.

FIG. 3 illustrates an exemplary environment 300 for performing wide-block encryption 306 of a compressed instance of plaintext 302, according to one exemplary embodiment. As shown, an uncompressed instance of plaintext 304 is received with instructions to encrypt such uncompressed plaintext 304. In response, the uncompressed instance of plaintext 304 is compressed 314 to create the compressed instance of plaintext 302.

Additionally, a size of the compressed instance of plaintext 302 is compared to a predetermined size threshold (e.g. a size of the uncompressed instance of plaintext 304 less a size of the zero pad 312 and a size of a length field 310), and is found to be less than the predetermined size threshold. In response to this determination, wide-block encryption 306 is performed on the compressed instance of plaintext 302 to create an encrypted compressed instance of plaintext 308 having the same size as the compressed instance of plaintext 302.

Further, a length of the compressed instance of plaintext 302 is determined and added as a length field 310 to the encrypted compressed instance of plaintext 308. A zero pad 312 having a variable-length (with predetermined minimum length) is created and appended to the compressed instance of plaintext 302.

In this way, a ciphertext string is created by combining the length field 310, the encrypted compressed instance of plaintext 308, and the zero pad 312. A length of this ciphertext string is the same as the uncompressed instance of plaintext 304, which maintains length-preserving compression (LPC). The length field 310 thereby represents the ciphertext field's length, which is also referred to herein as the "compressed data length." Moreover, the length field 310 preferably conveys the length of the encrypted compressed instance of plaintext 308 with as little information as possible. For instance, the length field 310 may only be 2 bytes of information in some implementations.

According to an in-use example, which is in no way intended to limit the invention, the total size (length) of a data instance formed a data storage server may be about 4096 bytes long. The size of the length field may be about 2 bytes. Moreover, the achievable data compression ratio of about 40 may be achieved, thereby making the compressed data length equal to about 82 bytes.

Figure 4:
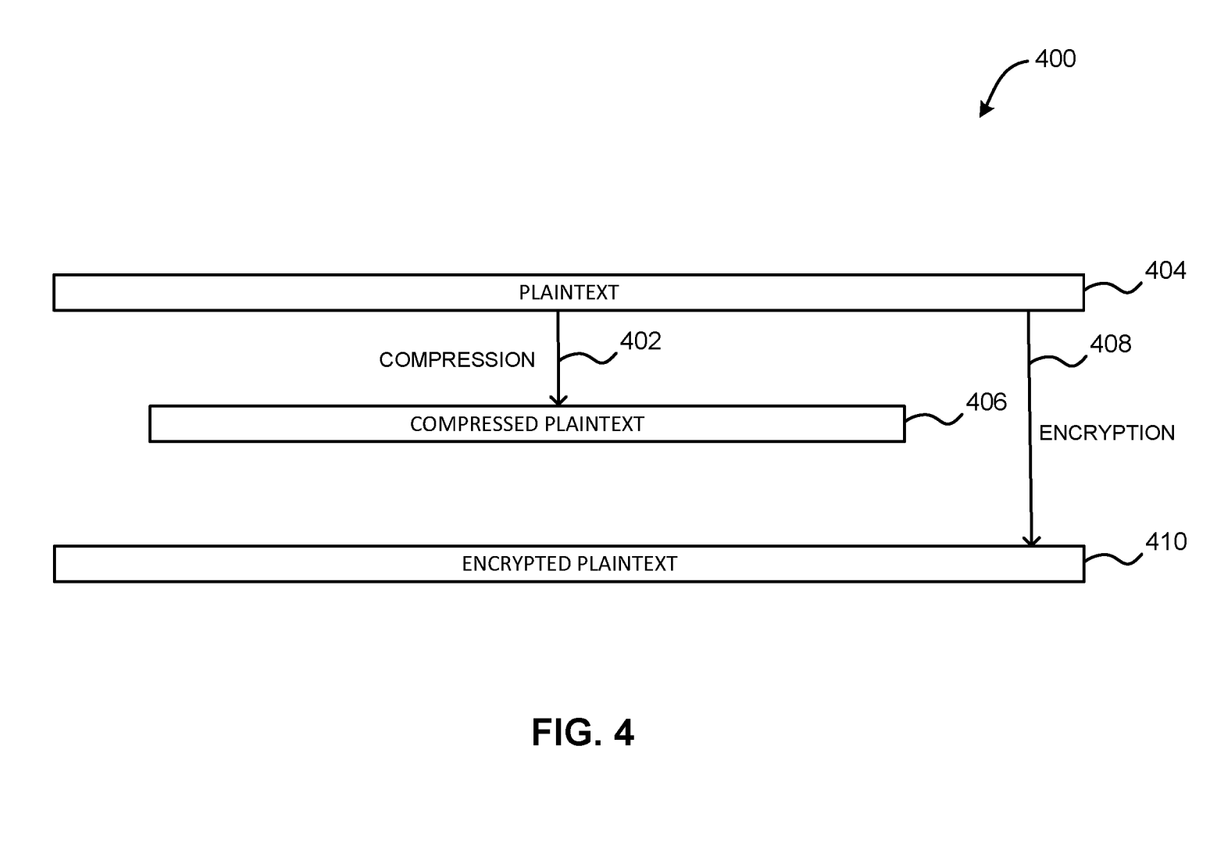
FIG. 4 is a representational view of performing wide-block encryption of an uncompressed instance of plaintext, in accordance with one embodiment.

FIG. 4 illustrates an exemplary environment 400 for performing wide-block encryption 408 of an uncompressed instance of plaintext 404, according to one exemplary embodiment. As shown, an uncompressed instance of plaintext 404 is received with instructions to encrypt such uncompressed plaintext 404. In response, the uncompressed instance of plaintext 404 is compressed 402 to create the compressed instance of plaintext 406.

Additionally, a size of the compressed instance of plaintext 406 is compared to a predetermined size threshold, and is found to be greater than the predetermined size threshold. In response to this determination, the compressed instance of plaintext 406 is discarded and wide-block encryption 408 is performed on the uncompressed instance of plaintext 404 to create an encrypted uncompressed instance of plaintext 410 having the same size as the uncompressed instance of plaintext 404.

In this way, length-preserving compression (LPC) is maintained, while producing a ciphertext string (the encrypted uncompressed instance of plaintext 410) using deterministic encryption that enables deduplication.

Some implementations are able to enable full deduplication in either a length preserving compression (LPC) or an opportunistic deduplication solution. For instance, an opportunistic deduplication solution enables selective data deduplication of data that has been processed by length preserving compression (LPC). More specifically, opportunistic deduplication enables data deduplication, but only of sufficiently compressible data which allows for three fields to be added:

1. A length field (to enable use of cipher stealing), which may be 2 bytes long,
2. An initialization vector (to allow convergent encryption), which may be 22 bytes long,
3. A zero pad field of adequate length, which may have a minimum length of 14 bytes.

The above solution assumes that if a given sector (or data deduplication chunk) is insufficiently compressible (and thus does not allow for the minimum lengths of all three of the above fields (without expansion), then the uncompressed data may be encrypted without expansion (e.g. using XTS-AES with the logical block address (LBA) used as the XTS 'tweak' value as would be appreciated by one skilled in the art after reading the present description).

This implementation may be extended by using of a wide-block encryption mode (e.g. EME2-AES, XCB-AES, etc.). Additionally, LPC itself may be extended using of a wide-block encryption mode.

For example, if a wide-block encryption mode such as EME2-AES is used (e.g. instead of XTS-AES), then deduplication may be performed on the encrypted version of data which does not compress to the predetermined threshold, i.e., insufficiently compressible data. The present invention extends the opportunistic deduplication algorithm by allowing the deduplication of insufficiently compressible data.

Also, a wide-block encryption mode (such as EME2) may be used to extend LPC itself (e.g. without the opportunistic deduplication extension). More specifically, a wide-block encryption mode may displace the use of XTS-AES and may be used to encrypt both the sufficiently compressible data as well as the insufficiently compressible data.

In one embodiment, a method of deduplication of data is provided, including compressing each unit of data into compressed data, calculating the length of the original unit of data minus the compressed data length, and comparing the result to a predetermined threshold. If the compression succeeds in reducing the length of the compressed data below the predetermined threshold, then the data is determined to be sufficiently compressible and is output in one of two ways, either a first way, or a second way. If the data is not sufficiently compressible, it is output in a third way.

For sufficiently compressible data, the compressed data is encrypted and output along with one or more of the following fields: a length field, an initialization vector (IV) field, and a variable-length zero pad field, where each field has a predefined minimum length.

A first way to encrypt sufficiently compressible data is to use the IV field and to populate that field with a hash (possibly keyed) and use an IV-dependent mode of encryption (such as a CTR, OFB, CFB, or CTR mode of encryption) such that convergent deterministic encryption is achieved.

A second way to encrypt sufficiently compressible data is to encrypt the compressed data with a wide-block encryption mode, such as EME2, and in this case there is no need for an IV field.

Sufficiently compressible data is output into a total length allowing for the encrypted compressed data, a length field, an IV field if required (e.g. the first way), a zero pad field, and, if desired, one or more additional associated metadata field(s), each of a defined minimum length.

In the case of insufficiently compressible data, the third way to encrypt is used. In this case, the original uncompressed data is encrypted directly with wide-block encryption such as EME2 which is length preserving such that the resultant ciphertext is the same length as the original cleartext data.

This enables potential data deduplication of all encrypted data output (if there are prior instances of the same cleartext received under the same encryption key), regardless of which of the three ways the data was encrypted.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a stream of data at a data storage server;
   in response to determining that the stream of data includes a subset of data instances that are not configured to implement data reduction accommodating persistent encryption, using calculated hash values to perform deduplication at the data storage server;
   in response to determining that the stream of data includes a subset of data instances that are configured to implement data reduction accommodating persistent encryption, compressing a first of the data instances to create a compressed first instance of data;
   in response to determining that a size of the compressed first instance of data is outside a predetermined range, encrypting the first instance of data utilizing wide-block encryption to create a ciphertext string; and
   using a predetermined subset of the encrypted first instance of data in the ciphertext string to perform deduplication at the data storage server,
   wherein the deduplication is performed at the data storage server without calculating a hash value at the data storage server.

2. The computer-implemented method of claim 1, comprising:
   determining whether the stream of data includes data instances that are configured to implement data reduction accommodating persistent encryption.

3. The computer-implemented method of claim 2, comprising:
   in response to determining that the stream of data includes a second subset of data instances that are not configured to implement data reduction accommodating persistent encryption:
     calculating the hash values for the second subset of data, and
     using the calculated hash values to perform deduplication at the data storage server.

4. The computer-implemented method of claim 1, comprising:
   in response to determining that the size of the compressed first instance of data is not outside the predetermined range, encrypting the compressed first instance of the data utilizing the wide-block encryption;
   adding a zero pad to the encrypted compressed first instance of data to create a ciphertext string; and
   using a predetermined subset of the encrypted compressed first instance of data to perform the deduplication at the data storage server.

5. The computer-implemented method of claim 4, comprising:
   adding a length field to the encrypted compressed first instance of data and the zero pad to create the ciphertext string, wherein the predetermined subset includes a same number of bytes of information in the respective encrypted instances of data.

6. The computer-implemented method of claim 1, wherein the compressed first instance of data is abandoned or deleted in response to determining that the size of the compressed first instance of data is outside the predetermined range.

7. The computer-implemented method of claim 1, wherein the wide-block encryption includes an EME2-AES encryption algorithm and/or an XCB-AES encryption algorithm.

8. A computer program product, comprising a computer readable storage medium having program instructions embodied therewith, the program instructions readable by a processor, executable by the processor, or readable and executable by the processor, to cause the processor to:
   receive a stream of data at a data storage server;
   in response to determining that the stream of data includes a subset of data instances that are not configured to implement data reduction accommodating persistent encryption, use calculated hash values to perform deduplication at the data storage server;
   in response to determining that the stream of data includes a subset of data instances that are configured to implement data reduction accommodating persistent encryption, compress a first of the data instances to create a compressed first instance of data;

in response to determining that a size of the compressed first instance of data is outside a predetermined range, encrypt the first instance of data utilizing wide-block encryption to create a ciphertext string; and use a predetermined subset of the encrypted first instance of data in the ciphertext string to perform deduplication at the data storage server, wherein the deduplication is performed at the data storage server without calculating a hash value at the data storage server.

9. The computer program product of claim 8, wherein the program instructions are readable and/or executable by the processor to cause the processor to:

determine whether the stream of data includes data instances that are configured to implement data reduction accommodating persistent encryption.

10. The computer program product of claim 8, wherein the predetermined subset of the encrypted first instance of data includes a set number of non-sequential bytes in the ciphertext string.

11. The computer program product of claim 8, wherein the program instructions are readable and/or executable by the processor to cause the processor to:

in response to determining that the size of the compressed first instance of data is not outside the predetermined range, encrypt the compressed first instance of data utilizing the wide-block encryption;

add a zero pad to the encrypted compressed first instance of data to create a ciphertext string; and use a predetermined subset of the encrypted compressed first instance of data to perform the deduplication at the data storage server.

12. The computer program product of claim 11, wherein the program instructions are readable and/or executable by the processor to cause the processor to:

add a length field to the encrypted compressed first instance of data and the zero pad to create the ciphertext string, wherein the predetermined subset includes a same number of bytes of information in the respective encrypted instances of data; and use a predetermined subset of the encrypted compressed first instance of data in the ciphertext string to perform deduplication at the data storage server, wherein the deduplication is performed at the data storage server without calculating a hash value at the data storage server.

13. The computer program product of claim 8, wherein the compressed first instance of data is abandoned or deleted in response to determining that the size of the compressed first instance of data is outside the predetermined range.

14. The computer program product of claim 8, wherein the wide-block encryption includes an EME2-AES encryption algorithm and/or an XCB-AES encryption algorithm.

15. A system, comprising:

a data storage server; and logic integrated with the data storage server, executable by the data storage server, or integrated with and executable by the data storage server, the logic being configured to:

receive a stream of data at a data storage server;

in response to determining that the stream of data includes a subset of data instances that are not configured to implement data reduction accommodating persistent encryption, use calculated hash values to perform deduplication at the data storage server;

in response to determining that the stream of data includes a subset of data instances that are configured to implement data reduction accommodating persistent encryption, compress a first of the data instances to create a compressed first instance of data;

in response to determining that a size of the compressed first instance of data is outside a predetermined range, encrypt the first instance of data utilizing wide-block encryption to create a ciphertext string; and use a predetermined subset of the encrypted first instance of data in the ciphertext string to perform deduplication at the data storage server, wherein the deduplication is performed at the data storage server without calculating a hash value at the data storage server.

16. The system of claim 15, wherein the logic is configured to:

determine whether the stream of data includes data instances that are configured to implement data reduction accommodating persistent encryption.

17. The system of claim 15, wherein the predetermined subset of the encrypted first instance of data includes a set number of sequential bytes in the ciphertext string.

18. The system of claim 15, wherein the logic is configured to:

in response to determining that the size of the compressed first instance of data is not outside the predetermined range, encrypting the compressed first instance of the data utilizing the wide-block encryption;

adding a zero pad to the encrypted compressed first instance of data to create a ciphertext string;

using a predetermined subset of the encrypted compressed first instance of data to perform the deduplication at the data storage server, wherein the deduplication is performed at the data storage server without calculating a hash value at the data storage server; and adding a length field to the encrypted compressed first instance of data and the zero pad to create the ciphertext string, wherein the predetermined subset includes a same number of bytes of information in the respective encrypted instances of data.

19. The system of claim 15, wherein the compressed first instance of data is abandoned or deleted in response to determining that the size of the compressed first instance of data is outside the predetermined range.

20. The system of claim 15, wherein the wide-block encryption includes an EME2-AES encryption algorithm and/or an XCB-AES encryption algorithm.

* * * * *